United States Patent
Horany

[15] 3,665,840
[45] May 30, 1972

[54] BROILER INCLUDING COOKING PLATE

[72] Inventor: Johnny O. Horany, P.O. Box 3334, Enid, Okla. 73701

[22] Filed: Sept. 9, 1970

[21] Appl. No.: 70,785

[52] U.S. Cl. ................................. 99/261, 99/339, 99/443, 99/427
[51] Int. Cl. .................................................. A23b 1/04
[58] Field of Search ................................. 99/261, 259–260, 99/331, 358, 421 P, 427, 443 C; 126/21 A, 299; 107/65

[56] References Cited

UNITED STATES PATENTS

| | | | |
|---|---|---|---|
| 1,964,372 | 6/1934 | Tygart | 99/260 |
| 2,790,380 | 4/1957 | Shryack | 99/261 |
| 2,167,047 | 7/1939 | Jackson et al. | 107/65 |
| 1,302,682 | 5/1919 | Legg | 99/260 |
| 1,302,952 | 5/1919 | Neff | 99/259 |
| 2,761,374 | 9/1956 | Sandler | 99/259 |
| 3,301,170 | 1/1967 | Beasley | 99/331 |
| 3,333,529 | 8/1967 | Wilson | 99/427 X |
| 3,502,020 | 3/1970 | Bressickello | 99/443 C |

Primary Examiner—Walter A. Scheel
Assistant Examiner—Arthur O. Henderson
Attorney—Jones and Lockwood

[57] ABSTRACT

A broiler for meats and the like has a bottom heat supply compartment and an oven compartment thereabove. The heating compartment has a top plate totally closing off the compartment from the oven thereabove. The oven has a rotisserie driven by a motor, and there are easily-removable meat carrying shelf-like members on the rotisserie. There is an access door in the oven and this operates a switch in a power supply circuit to an exhaust fan that is operated when the access door is open. Towards the bottom of a side wall of the oven there is an access passageway in which is received a box-like element with an apertured top portion and having an electric heating element to burn smoke creating chips. A thermostat element in the oven is connected to a heating means in the heating compartment to control the temperature in the oven.

3 Claims, 10 Drawing Figures

Patented May 30, 1972

INVENTOR
JOHNNY O. HORANY

BY *Jones and Lockwood*

ATTORNEYS

INVENTOR
JOHNNY O. HORANY
BY Jones and Lockwood
ATTORNEYS

Patented May 30, 1972

INVENTOR
JOHNNY O. HORANY
BY Jones and Lockwood
ATTORNEYS

Patented May 30, 1972

INVENTOR
JOHNNY O. HORANY

BY *Jones and Lockwood*
ATTORNEYS

BROILER INCLUDING COOKING PLATE

An object of the invention is to obtain the smoke flavor of food products without the use of charcoal briquettes and the like or open fire cooking.

Another object of the invention is to provide an oven for cooking meat, fowl, or fish to obtain a smoke flavor while maintaining the heating source completely sealed off from the atmosphere within the cooking oven.

A further object of the invention is to provide cooking apparatus for cooking meats, fowl or fish that is free of ashes from charcoal briquettes or wood and prevents burning of the food products arising from flash fires caused by grease dripping into a hot bed of charcoal or the like.

Other objects and advantages of the invention will become apparent upon reading the attached detailed description, and upon reference to the drawings, in which.

Throughout the description, like reference numbers refer to similar parts.

Figure 1:
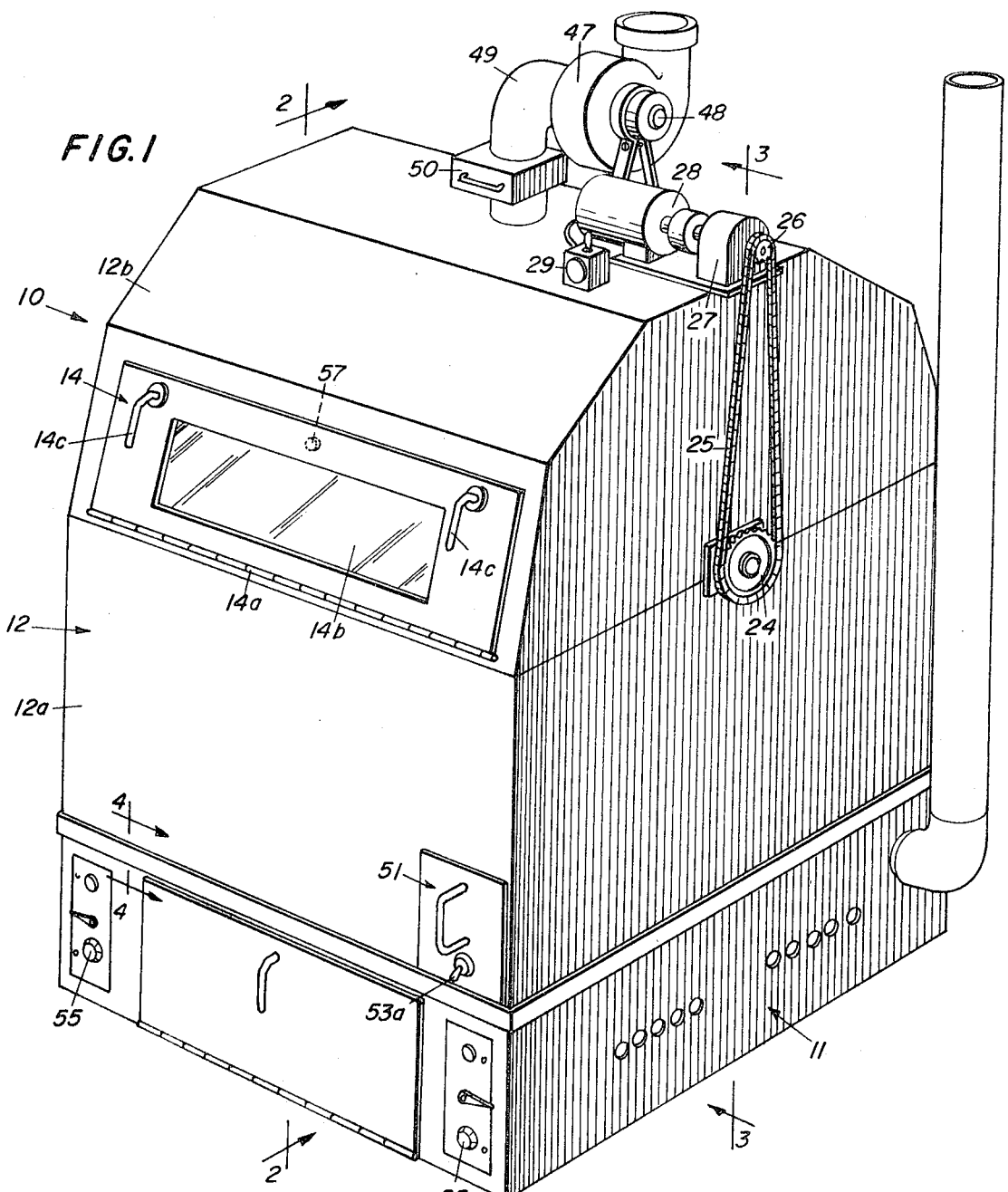
FIG. 1 is a front perspective view of the broiler.

The broiler is generally indicated at 10. It has a heating compartment 11 at its bottom, an oven compartment 12 thereabove totally separated from the heating compartment by a solid plate 13. The oven has a bottom half 12a and a top half 12b. The top half of the oven 12b has an access door 14 hinged by a piano hinge 14a to a top edge of the bottom half. This door 14 is provided with an inspection window 14b and hand operated turn catches 14c.

Within the oven is a rotisserie generally indicated at 15. It is rotatably supported by a drive shaft 16 supported at each end in bearings 17 mounted in the side walls of the oven bottom half 12b. At each end portion of shaft 16 is mounted a disc-like end member 18 as by collar member 18a. Extending transversely inward from each plate 18 at the peripheral portion are equally peripherally spaced mounting pin assemblies 19 made up of a cap screw threadedly received in a threaded aperture in the plate and receiving thereon a roller with a nut locking the cap screw in place on the plate.

Figure 3:
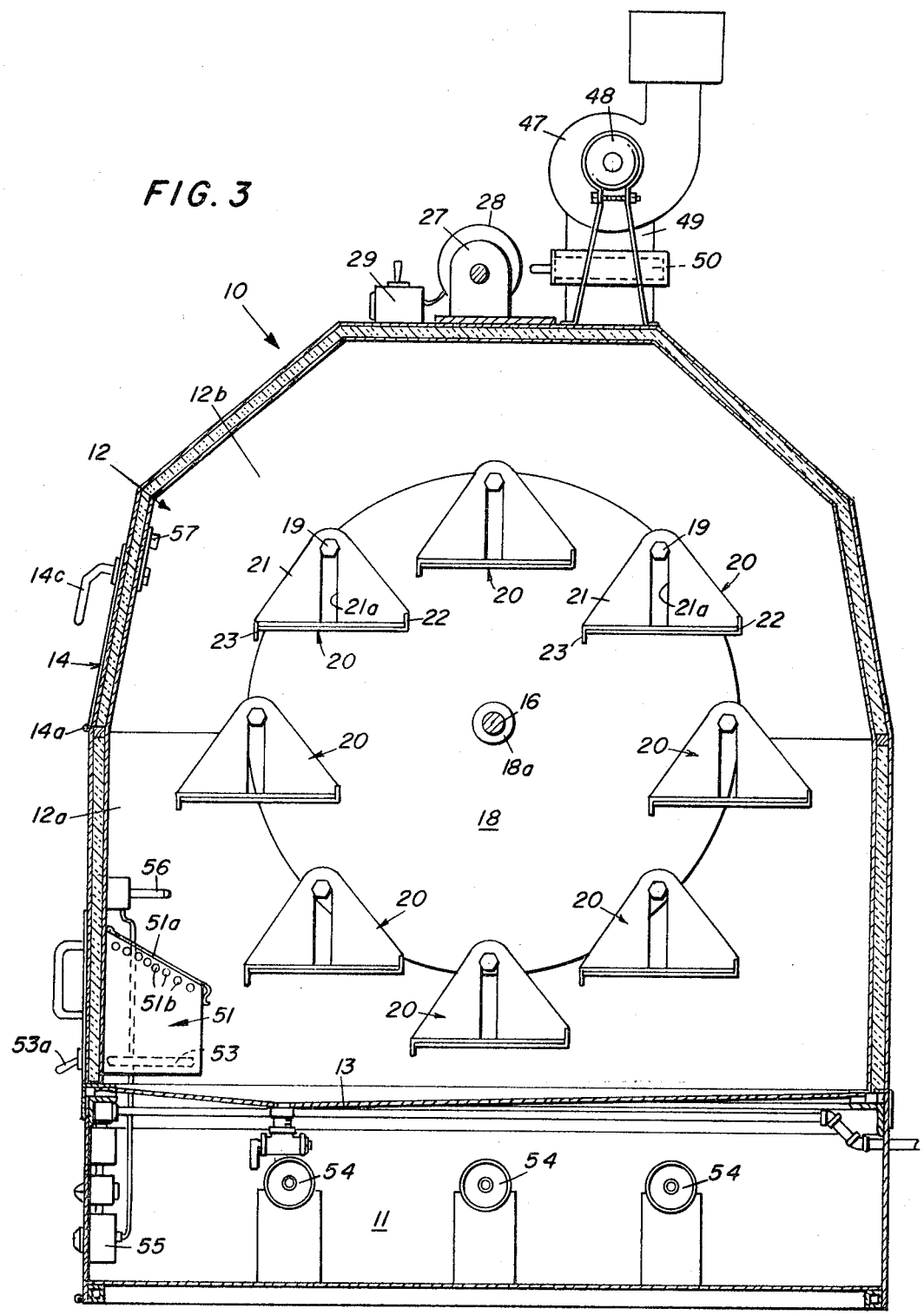
FIG. 3 is a cross-sectional view from front to back along line 3—3 of FIG. 1.

Suspended on the roller of the pin assemblies 19 are shelf-like supports 20. Each shelf-like support 20 for the meat or articles to be treated has two triangular shaped end plates 21 formed with a slot 21a extending from the base to adjacently just below the apex so as to be received over the roller of the pin assembly 19. Connecting the lower opposite corners of the oppositely disposed pairs of end plates as by welding are elongated angle iron cross members 22 and 23, one of which has a flange extending up and the other has a flange extending down as shown in FIG. 3. Received on the angle iron cross pieces 22 and 23 is an expanded metal rack or shelf member which is easily installed and removed for cleaning.

Figure 10:
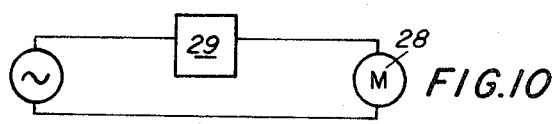
FIG. 10 is a wiring circuit showing a speed control in the power supply to the variable speed exhaust fan.
Figure 2:
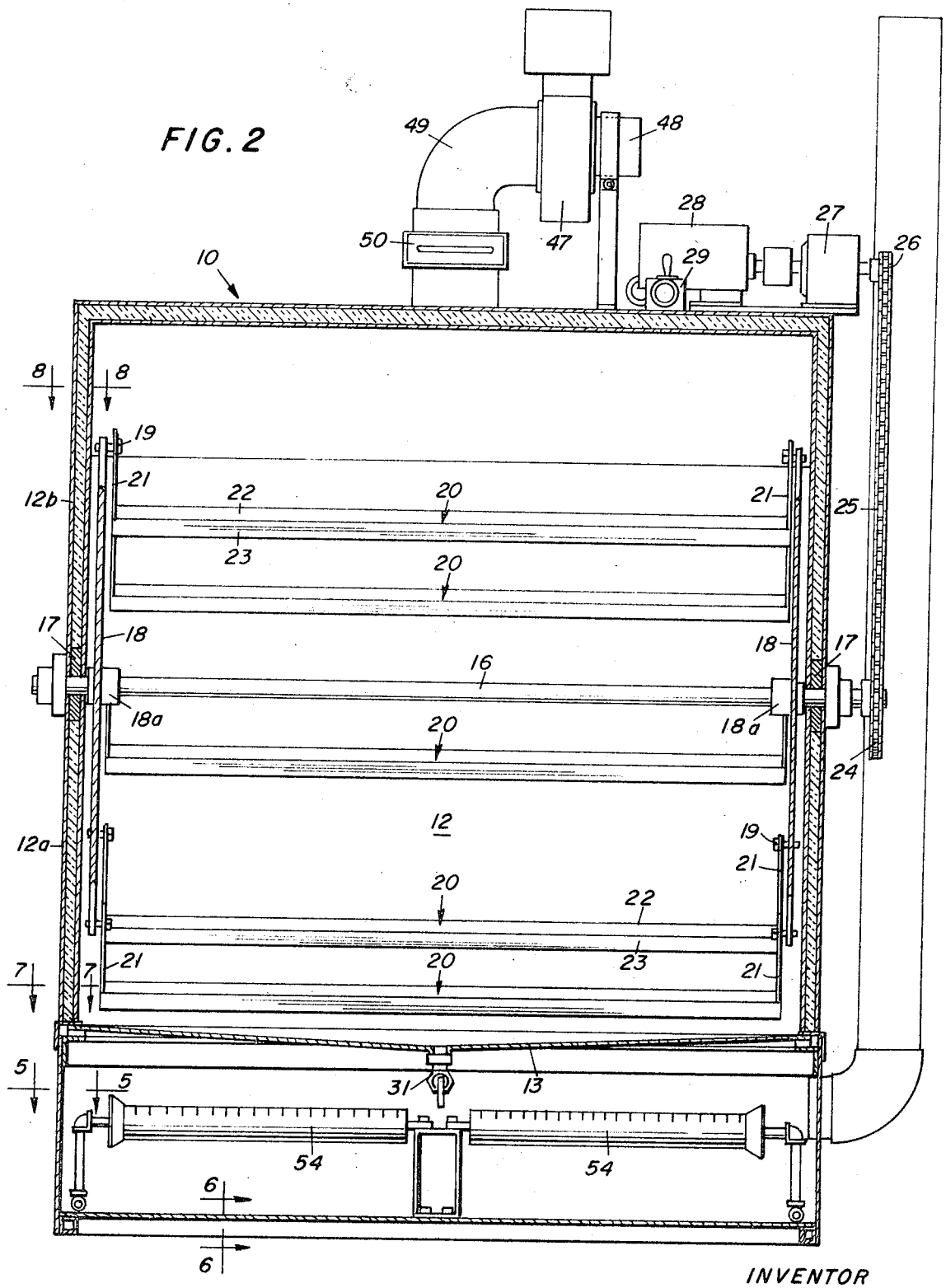
FIG. 2 is a cross-section from side to side of the broiler in FIG. 1 along line 2—2.

The rotisserie mounting and drive shaft 16 has a drive sprocket 24 on an end extending outside the oven enclosure 12. A drive chain 25 leads from sprocket 24 to a drive sprocket 26 on a power drive speed reducer 27 mounted on top of the oven 12. The speed reducer 27 is driven by an electric motor 28 also mounted on top of oven 12. This motor 28 is controlled by a speed controller 29 as shown also mounted on top of the oven 12 and shown in the power circuit to motor 28 in FIG. 10.

The plate 13 which totally separates the heat supply compartment 11 and the oven 12 thereabove is shaped or dished so as to drain any drippings to a drain cock fitting 31, see FIG. 3.

Figure 4:
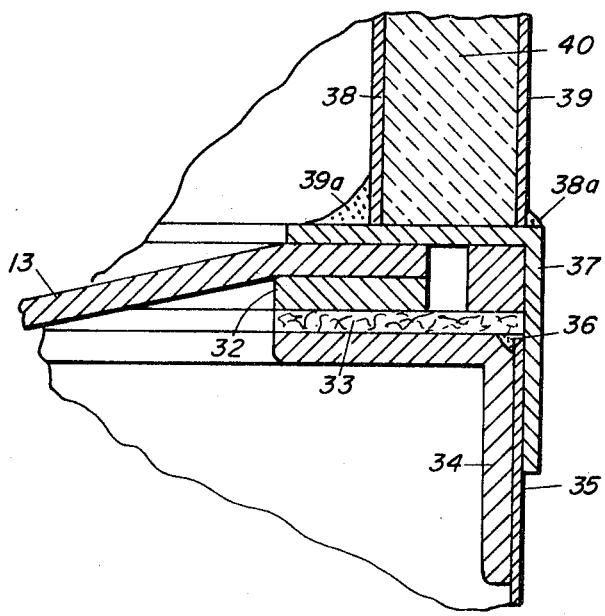
FIG. 4 is a fragmentary cross-sectional view on an enlarged scale along line 4—4 of FIG. 1 showing the plate mounting sealing off the bottom heat supply compartment from the oven thereabove.

The plate 13 has a bottom edge strip 32 attached and this rests as shown in FIG. 4 on a strip of asbestos 33. The asbestos strip 33 rests on an inturned flange of an angle iron framing member 34 whose depending flange is attached to a side wall plate 35 of the bottom heating compartment 11 as by welding 36. A support angle iron 37 of a frame has an inturned flange resting on top of the edge of plate 13 while its other flange depends over the edge of plate 13 and against the outside of wall plate 35. Extending up from the inturned flange of angle iron member 34 are spaced wall plates 38 and 39 of the oven 12 that are attached as by welding at 38a and 39a to the inturned flange. Received between the plates 38 and 39 is insulating material 40.

Figure 5:
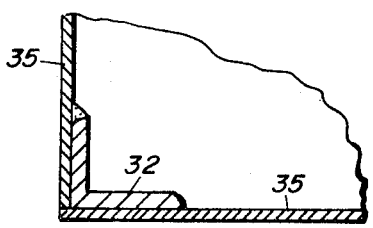
FIG. 5 is a cross-sectional view on an enlarged scale along line 5—5 of FIG. 2 showing the corner wall structure of the heating compartment.
Figure 6:
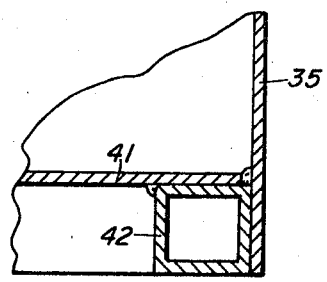
FIG. 6 is a cross-sectional view along line 6—6 of FIG. 2 showing the bottom structure of the heating compartment.

The heating compartment 11 has a floor 41 supported at its edge by a square tubular frame member 42, see FIG. 6, to which it is attached as by welding. The side 35 abuts the side of member 42 and the edge of floor member 41 to which it is also welded. A corner of the heating compartment 11 is shown in cross-section in FIG. 5. An angle iron serves as a corner post to which is welded the side plates 35.

Figure 7:
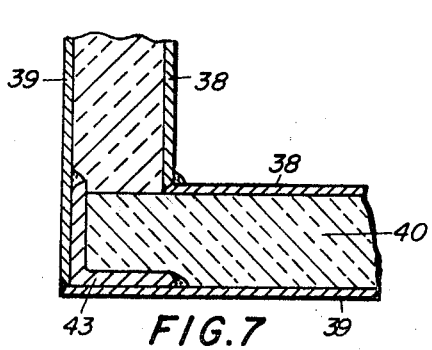
FIG. 7 is a cross-sectional view on an enlarged scale along line 7—7 of FIG. 2 showing the corner wall structure of the oven bottom half portion.

In FIG. 7 is shown in cross-section a corner of the lower half 12a of the oven. Here the outer side plates 39 are jointed by an angle iron which serves as a corner post 43. The parts are secured together as by welding. The insulation is shown at 40 between the spaced walls.

Figure 8:
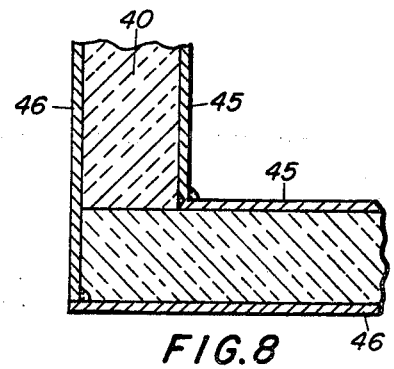
FIG. 8 is a cross-sectional view on an enlarged scale along line 8—8 of FIG. 2 of the top half of the oven.

In FIG. 8, there is shown the corner structure of the top half 12b of the oven 12. It has spaced wall plates 45 and 46 welded together at their respective plate junctures. Insulation 40 is also inserted between the wall plates 45 and 46.

An exhaust fan 47 is shown also mounted on top of the oven enclosure 12 and it is driven by a motor 48. A pipe connection leads from the top wall portion of the oven 12 to the exhaust fan 47 and there is a removable filter 50 in this pipe connection 49.

In the front of the lower half 12a of the oven 12 below the door 14 and just above the drip plate 13 is an opening through which is removably inserted a chip burner 51. It has a hinged lid 51a and has apertures 51b in the upper portion of its walls. Inside the chip burner and spaced from its bottom is an electric heating element 53 controlled by an electric switch 53a.

The heating compartment is illustrated as having gas burners 54 having gas supply controls at 55 which have a sensor thermostat 56 within the oven 12.

Figure 9:
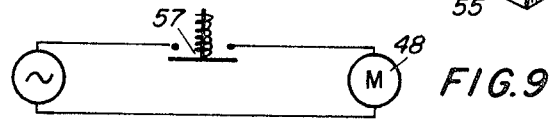
FIG. 9 is a wiring circuit showing the exhaust fan motor in circuit with a starter switch that is closed to complete a power circuit when the door of the oven is opened.

When the inspection door 14 is opened, a switch 57, see FIGS. 1 and 9, is closed and completes a circuit to the exhaust fan motor 48 so that on opening the door a suction is placed on the oven enclosure 12 to remove the smoke and prevent its escape out through the door opening.

It is particularly important that the heating compartment be completely sealed off from the oven when the heat source is natural or liquid petroleum gas. The plate 13 is from ⅛ inch to 2 inches in thickness depending upon the size of the cooker. It may be steel, cast iron or aluminum. When the metal plate is heated to a temperature of 150° F. or more, the grease dripping onto the metal plate will burn and form smoke which will give the food a smoked charcoal flavor. The slow burning wood chip smoke from the smoke device 51 adds the particular wood smoked flavor as desired.

The rotating shelves or racks 20 rotate at a speed of about 1 revolution every 2 minutes. The speed may be varied by the adjustment of the speed controller 29.

I claim as my invention:

1. A broiler for meats and the like comprising, in combination, a heat supply chamber with a heating means therein and having a generally horizontally extending top plate attached to and entirely closing off communication between the heat supply chamber and the top of said plate except by heat transfer through the plate, an oven enclosure attached to said heat supply chamber and extending above said plate which serves as a floor for said oven enclosure, the interior of said oven enclosure being entirely closed off from communication with said heat supply chamber except by said heat transfer through said plate, support means in said oven enclosure for meat and the like whereby heat from said heat source broils or barbecues said meat and drippings from the meat fall on the top of said plate, vaporize and provide an atmosphere totally separated from said heat supply chamber, and said atmosphere permeates said meat and imparts a charcoal flavor thereto, said support means in the oven for meat and the like being a ferris wheel-like rotisserie structure having a horizontally mounted drive shaft in said oven enclosure, a disc-like end member at each end of the drive shaft, each end member having axially extending support pins spaced radially from said drive shaft and circumferentially spaced apart uniformly, a support plate having an elongated slot therein received pivotally on each support pin and a reticulated support shelf-like member for meat and the like extending between and supported at each end by said slotted support plates whereby said slotted support plates and reticulated members form racks that are easily removable for easy cleaning, said rotisserie structure on being rotated stirs said atmosphere within said oven and provides a uniform mixture for permeating and flavoring the meat.

2. A broiler for meats and the like comprising, in combination, a heat supply chamber with a heating means therein and having a generally horizontally extending top plate attached to and entirely closing off communication between the heat supply chamber and the top of said plate except by heat transfer through the plate, an oven enclosure attached to said heat supply chamber and extending above said plate which serves as a floor for said oven enclosure, the interior of said oven enclosure being entirely closed off from communication with said heat supply chamber except by said heat transfer through said plate, support means in said oven enclosure for meat and the like whereby heat from said heat source broils or barbecues said meat and drippings from the meat fall on the top of said plate, vaporize and provide an atmosphere totally separated from said heat supply chamber, and said atmosphere permeates said meat and imparts a charcoal flavor thereto, said oven enclosure having an electrically powered exhaust fan having a power supply circuit, said fan being in communication with the interior of said oven enclosure and an access door in said oven enclosure, a door operated switch in said power supply circuit whereby opening of said access door actuates said switch and completes a circuit to operate said exhaust fan.

3. A broiler for meats and the like comprising, in combination, a heat supply chamber with a heating means therein and having a generally horizontally extending top plate attached to and entirely closing off communication between the heat supply chamber and the top of said plate except by heat transfer through the plate, an oven enclosure attached to said heat supply chamber and extending above said plate which serves as a floor for said oven enclosure, the interior of said oven enclosure being entirely closed off from communication with said heat supply chamber except by said heat transfer through said plate, support means in said oven enclosure for meat and the like whereby heat from said heat source broils or barbecues said meat and drippings from the meat fall on the top of said plate, vaporize and provide an atmosphere totally separated from said heat supply chamber, and said atmosphere permeates said meat and imparts a charcoal flavor thereto, said oven enclosure having a separate accessway to the interior thereof from the outside and a smoke supply means movable through said accessway to a position within said oven to supply smoke to said oven, said smoke supply means including a heat creating means housed therewith.

* * * * *